United States Patent [19]

Woodbury, Jr.

[11] 4,082,110
[45] Apr. 4, 1978

[54] WATER LEVEL CONTROL FOR TOILET HAVING VERTICAL FLOAT

[76] Inventor: John L. Woodbury, Jr., 7515 Cornith Dr., Alexandria, Va. 22306

[21] Appl. No.: 730,079

[22] Filed: Oct. 6, 1976

[51] Int. Cl.² ............................................. F16K 31/18
[52] U.S. Cl. .................................. 137/426; 137/430
[58] Field of Search ........................ 4/41, 55, 56, 67 A, 4/67 R, 34, 18 A; 137/426, 430

[56] References Cited

U.S. PATENT DOCUMENTS

| | | | |
|---|---|---|---|
| 2,767,405 | 10/1956 | Iverson | 4/55 |
| 3,141,177 | 7/1964 | Kertell | 4/67 A |
| 3,428,960 | 2/1969 | Schoepe et al. | 4/56 |
| 3,945,056 | 3/1976 | Kowalski | 4/67 A |
| 3,956,777 | 5/1976 | Hockly | 137/426 X |

Primary Examiner—Richard E. Aegerter
Assistant Examiner—Frederick R. Schmidt
Attorney, Agent, or Firm—Berman, Aisenberg & Platt

[57] ABSTRACT

A simple modification to existing water closets of the type which utilize a vertical float assembly that permits the user to select, each time the toilet is to be flushed, whether a relatively small or relatively large amount of water will be required to flush the wastes from the toilet bowl. The water level control mechanism is automatically biased to fill the water tank of the toilet to a first, relatively low level. A push-button may then be actuated to release the float and open the inlet valve to permit additional water to fill the tank to a second, relatively high level. In this manner, water conservation may be maximized.

16 Claims, 7 Drawing Figures

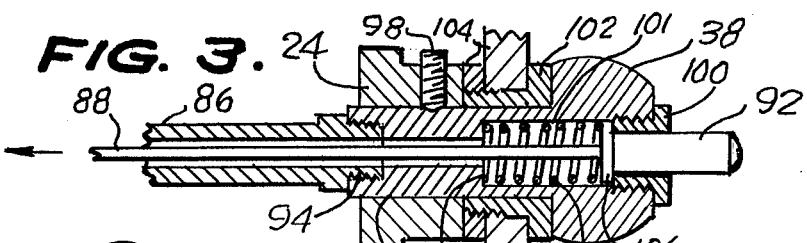
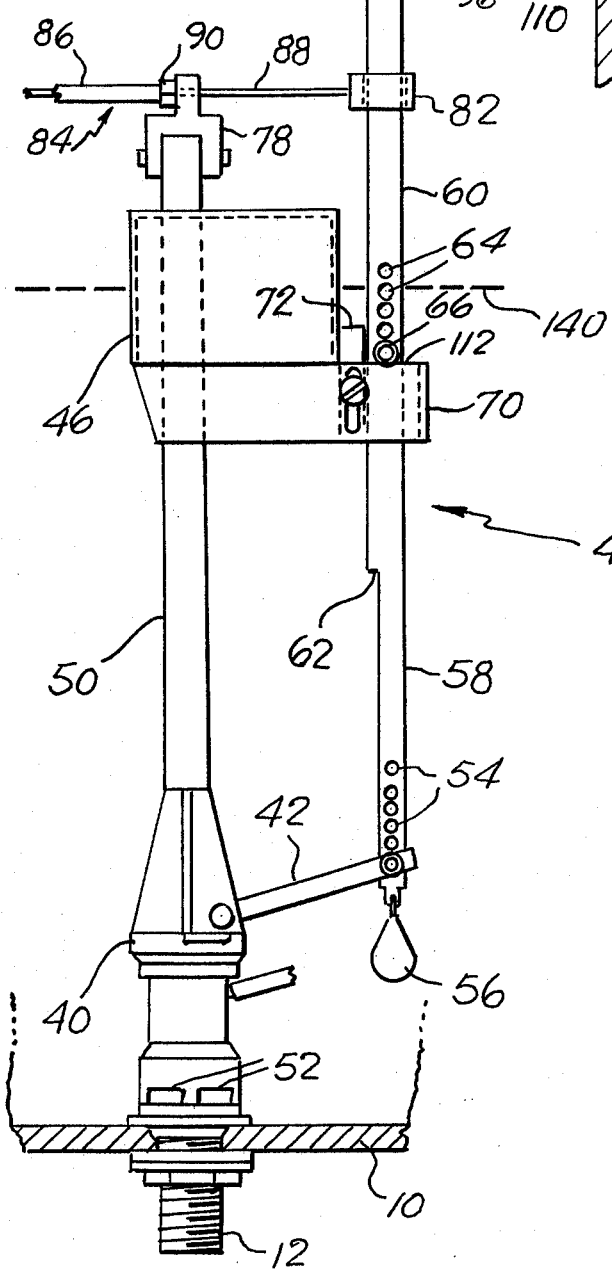
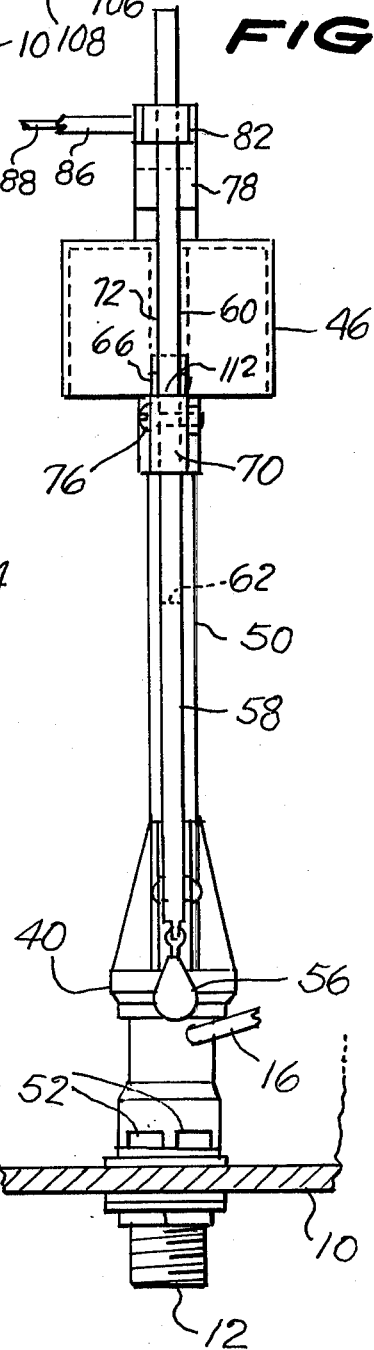

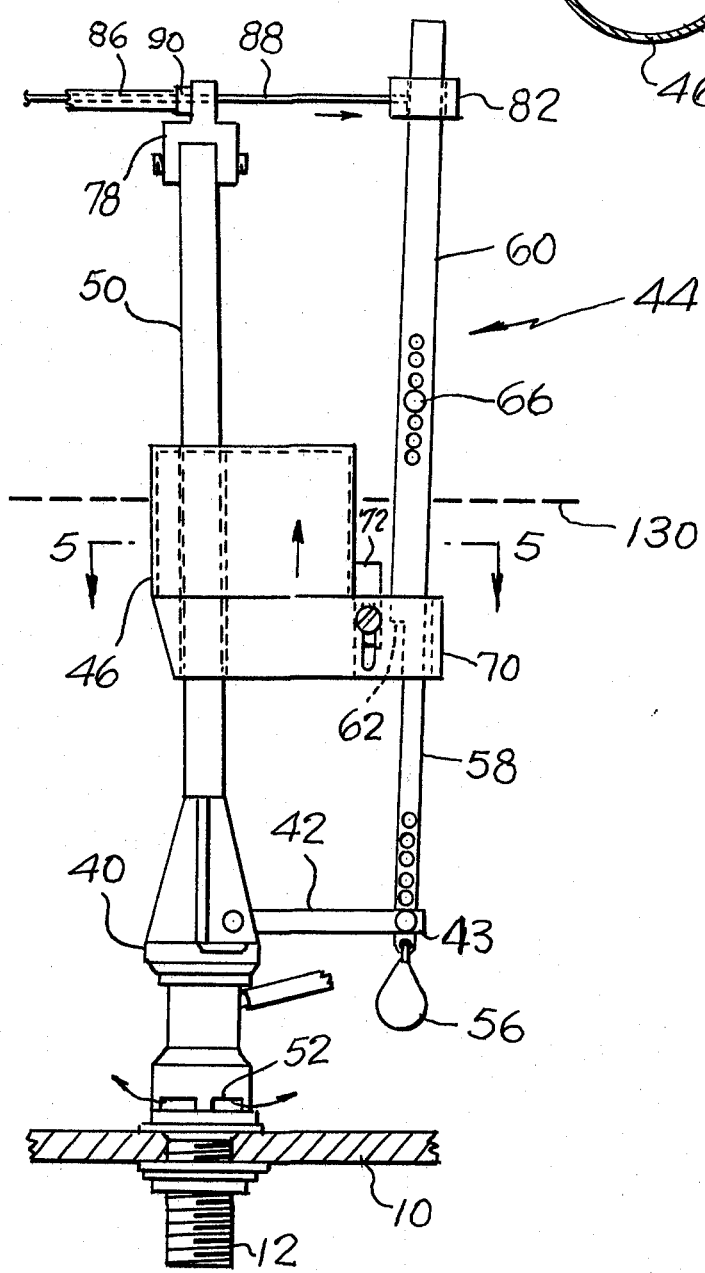

WATER LEVEL CONTROL FOR TOILET HAVING VERTICAL FLOAT

BACKGROUND OF THE INVENTION

1. Field of the Invention

The present invention is related to water closets and, more particularly, is directed towards a mechanism for permitting the user of a toilet to select either a relatively small or relatively large volume of water for each flushing operation.

2. Description of the Prior Art

Many water level control systems have been suggested in an earnest effort to enable the user of a toilet to control the amount of water required for each flushing operation.

Some such systems operate by filling the water tank of the toilet to the same level after each flushing operation. Water is conserved by controlling the length of time that the outlet valve is opened in order to control the amount of water released from the tank to the bowl.

Other systems, in contradistinction, rely upon control of the inlet valve to thereby vary the total amount of water stored within the tank. In these systems, the outlet valve operates in a normal fashion to simply deliver to the toilet bowl all water contained within the tank when the toilet is flushed. Water conservation is achieved by filling the tank with only so much water as may be necessary to flush the wastes from the bowl.

Prior art United States patents of which I am aware which are illustrative of mechanisms which operate according to the first above-described mode of controlling the outlet valve include: U.S. Pat. Nos. 2,724,838; 3,141,177; 3,758,893; 3,839,746; and 3,894,299.

I am also aware of the following United States patents which illustrate examples of devices whose operation is based on the second above-named water conservation principle, i.e. that of controlling the inlet valve to the water tank: U.S. Pat. Nos. 3,385,317; 3,906,553; 3,945,057; and 3,956,777.

Each of the devices described in the cited patents suffers from one or more deficiencies which hinders their wide-spread use and adoption by the average consumer. Most of the mechanisms and devices are either too expensive, too complex to either manufacture or install, require internal rather external control, or simply do not provide the degree of control necessary to insure reliable and worthwhile operation.

There exists a further deficiency which is common to all of the devices described in the patents above-cited. That is, each may be utilized only in combination with conventional water closet float mechanism which, generally speaking, comprise a hollow, generally spherical float which is attached to the end of a horizontally disposed float lever which controls, at its distal end, the inlet valve of the toilet, cutting off the inlet valve when the float has risen to a predetermined height.

There is, however, in widespread use today another class of water closet mechanisms which differ substantially from those above-described in providng a float which is vertically movable along a vertically disposed guide member that extends through a guide-receiving aperture formed in the float. Examples of such mechanisms can be found in U.S. Pat. Nos. 3,319,913; 3,428,966; 3,429,333; and 3,576,199, and are known to be marketed under the trade name "FLUIDMASTER". They enjoy wide popularity due to their superior valve construction, ease of installation, quiet performance, and overall high reliability.

However, to the best of my knowledge, no one has yet proposed a practical water-lever control device which may be utilized in conjunction with the vertical float type of water closet. In order to be practical, such a device should be easily adaptable to existing toilets, economical to manufacture, of extreme simplicity, and reliable in operation.

OBJECTS AND SUMMARY OF THE INVENTION

It is, therefore, a primary object of the present invention to provide a water level control device for utilization in conjunction with water closets having vertically moveable floats.

Another object of the present invention is to provide a water level control mechanism which may be easily installed, which is economical to manufacture, which is simple in structure, and reliable in operation.

A further object of the present invention is to provide a device which permits the user of a water closet having a vertically moveable float to select either a small or large volume of water for the flushing operation, which selection may be effectuated by the actuation of a pushbutton.

An additional object of the present invention is to provide a device, which may be utilized in conjunction with water closets having floats which move along vertical posts, by means of which the water level within the water tank of the toilet is pre-selected to fill to a first, relatively low level, and which, upon actuation of an external control mechanism, permits the float to rise to a second, relatively high level.

The foregoing and other objects are attained in accordance with one aspect of the present invention through the provision of a dual water level control device for utilization in combination with a toilet having a water tank, a bowl, and an outlet valve for releasing the water in the tank to flush wastes from the bowl, an inlet valve for supplying water to the tank, the inlet valve being controlled by a float mounted for vertical movement on a vertically oriented guide. The water level control improvement comprises means for selectively coupling the float to the inlet valve for permitting adjustment of the water level within the tank at which the inlet valve is turned off. Means are also provided which are mounted externally of the tank for allowing manual actuation of the adjustment means. More particularly, the adjustment means comprises means for selecting one of two distinct water levels, relatively low and relatively high, at which the inlet valve will be turned off.

In accordance with other aspects of the present invention, the adjustment means further comprises lever means connected to the inlet valve for turning same on and off, the lever means having means selectively engageable by the upward movement of the float for normally turning off the inlet valve at the relatively low water level. The float preferably includes a boss positioned on the periphery thereof through which the level means extends, the float also including means connected thereto for selectively engaging the level means during upward movement of the float, which, in a preferred form, comprises a catch member protruding from the periphery of the float at a position adjacent to the boss.

In accordance with other aspects of the present invention, the means which are selectively engageable by the upward movement of the float comprises a notch formed along an edge of the lever means for selective engagement by the catch member on the float. The manual actuation means preferably includes means for normally biasing the notch into the path of the upward movement of the catch member. The biasing means further preferably comprises means coupled to the lever means for permitting the notch to be positioned out of the path of the catch member when the upper, relatively high, water level is desired.

In accordance with more specific aspects of the present invention, the biasing means preferably comprises a spring-loaded, push-button actuator positioned externally of the tank, and which may be incorporated as part of the regular flush handle of the toilet. Means connect the push-button actuator to the lever means for controlling the lateral positioning of the lever means. Again, more specifically, the lever means comprises a substantially rigid, vertically oriented link whose lower end is pivotally connected to the control arm of the inlet valve, and whose upper end extends through a guide member which is laterally moveable in response to the actuation of the spring-loaded push-button. The lower end of the link preferably includes a weight for assisting in the opening of the inlet valve when the spring-loaded push-button is actuated. The link further includes means positioned above the notch for engagement by the boss when the float has risen to the relatively high water level for shutting off the inlet valve. More specifically, the means connecting the actuator means to the top of the link comprises a cable connected between the guide member and the externally provided push-button. In accordance with a preferred embodiment, a support member is positioned on the top portion of the vertically oriented guide, through which the cable is fed between the external push-button and the top of the link.

BRIEF DESCRIPTION OF THE DRAWINGS

The foregoing and other objects, aspects, features and advantages of the present invention will be more fully appreciated as the same become better understood from the following detailed description thereof when considered in connection with the accompanying drawings, in which:

FIG. 3 is a cross-sectional view of a preferred embodiment of the handle actuator mechanism of the present invention and taken along line 3—3 of FIG. 1;

FIG. 4 is a view similar to that of FIG. 2 but illustrating the components in a different operative condition;

FIG. 5 is a sectional view of certain of the components illustrated in FIG. 4 and taken along line 5—5 thereof;

FIG. 6 is a side view of the same components illustrated in FIGS. 2 and 4, but which shows a different operative condition thereof; and FIG. 7 is a side view in elevation of the FIG. 6 configuration of the components which comprise a preferred embodiment of the present invention.

DETAILED DESCRIPTION OF THE PREFERRED EMBODIMENTS

Figure 1:
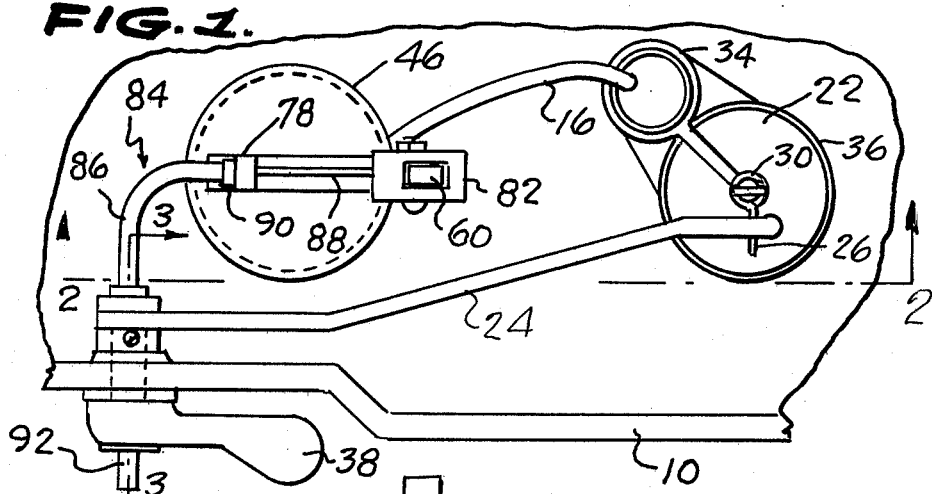
FIG. 1 is a top view of the components which comprise a preferred embodiment according to the present invention.
Figure 2:
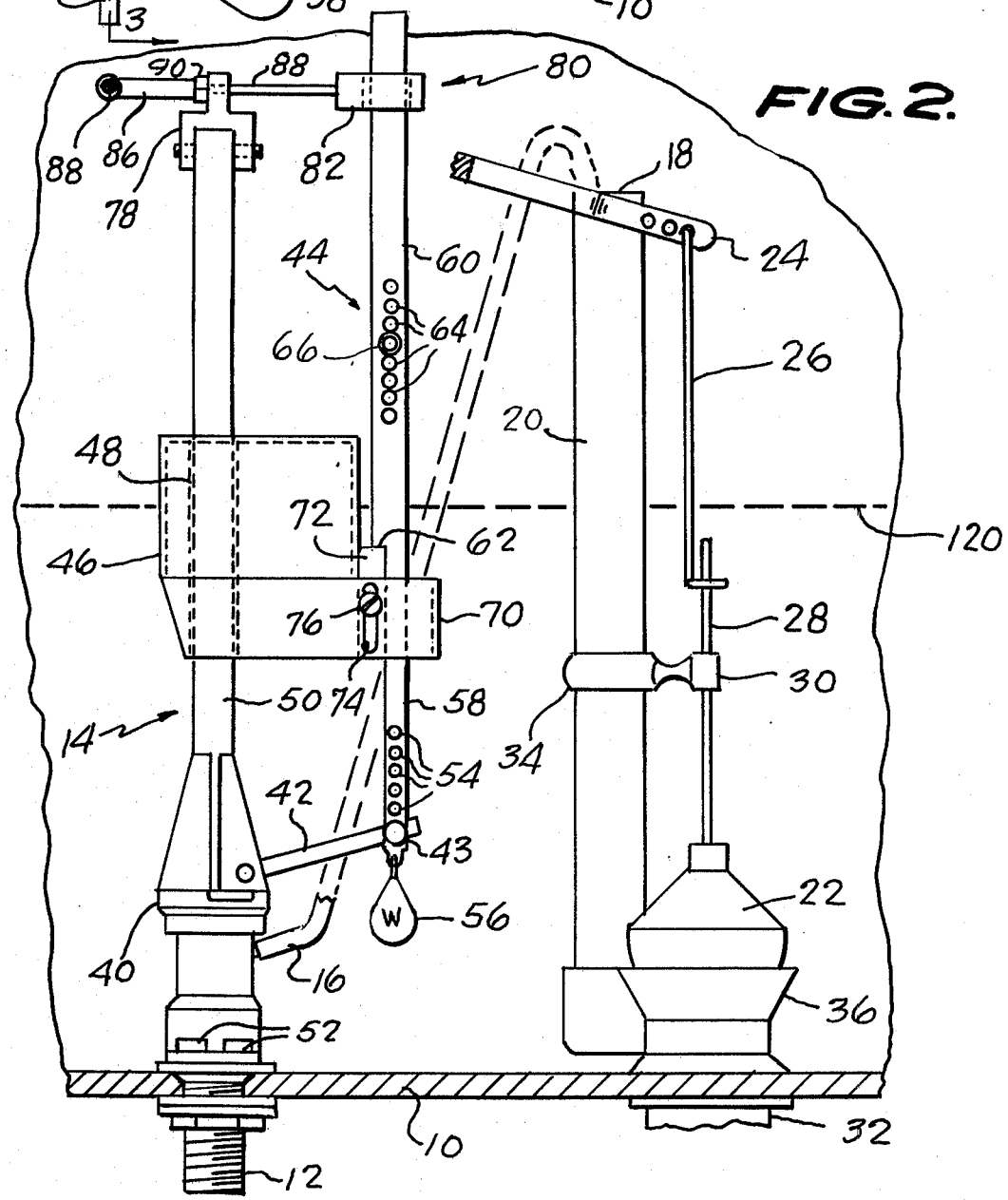
FIG. 2 is a side view, partly in section, of the preferred embodiment illustrated in FIG. 1 and taken along line 2—2 thereof.

Referring now to the drawings, wherein like reference numerals indicate identical or corresponding parts throughout the several views, and more particularly to FIGS. 1 and 2 thereof, there is illustrated in a top and side view, respectively, a preferred embodiment of the water level control system of the present invention utilized with a vertically moveable float assembly. The type of ball cock float assemblies with which the present invention may be utilized are described more fully in U.S. Pat. Nos. 3,319,913; 3,428,966; 3,429,333; and 3,576,199 which are all in the name of Schoepe et al.

FIGS. 1 and 2 illustrate a conventional toilet flush tank 10 having a water inlet pipe 12 operably connected in communication with a ball cock generally indicated at 14 for controlling the flow of water into the tank 10 and through the refill hose 16 into the opening 18 at the upper extremity of an overflow tube 20.

The ball cock 14 operates in a conventional manner for controlling the flow of water from the water inlet pipe 12 into the flush tank 10 and simultaneously through the refill hose 16 into the overflow tube 20, the specific details of construction of ball cock 14 being fully described in the above-cited patents to Schoepe et al.

Further in a conventional manner, water is discharged from the tank 10 through an opening 32 in the bottom wall thereof. Opening 32 is controlled by a valve 22 and its associated valve seat 36. Actuation of the valve 22 is effected through a linkage which comprises a lever 24, a link 26, and a rod 28, in the usual fashion. The linkages enable the unseating of the valve 22 from its seat 36 from the outside of the tank via handle 38 (FIG. 1). Rod 28 is constrained to move vertically within a guide 30 which is fastened about overflow tube 20 via a connecting ring fastener 34.

The ball cock 14 includes an inlet valve 40 which is made operable through a valve-operating lever 42 which, in the position illustrated in FIG. 2, is off. When lowered to the position illustrated in FIG. 4, valve-operating lever 42 acts to open valve 40 to admit water to tank 10 via openings 52.

A vertically moveable ball cock float 46 includes a guide-receiving passage 48 formed therein to permit vertical movement of float 46 along a vertical mast or guide 50. The basic construction of float 46 is described in more detail in the Schoepe et al, U.S. Pat. No. 3,428,966, but is modified according to the present invention as will be described in more detail hereinafter.

Connected to the distal end of valve-operating lever 42, as at a pivot 43, is a float trip linkage indicated generally by reference numeral 44. Linkage 44 comprises a substantially rigid vertically oriented rod having a lower reduced width portion 58 and an upper increased width portion 60. The boundary between the lower and upper portions 58 and 60 is defined by a notch or shoulder 62 which is preferably formed at right angles to the edges of portions 58 and 60 thereadjacent.

In the lower portion 58 of linkage 44 there are formed a plurality of apertures 54 within any of which pivot 43 to valve 42 may be connected as a coarse adjustment for the establishment of a first, relatively low water level, indicated by reference numeral 120. In FIG. 2, pivot 43 is shown connected to the lower-most aperture 54. The bottom end of lower portion 58 has a weight 56 connected thereto, for a purpose which will become more clear hereinafter.

The upper portion 60 of linkage 44 includes a plurality of apertures 64 which permit a coarse adjustment of a second, relatively high water level within tank 10. The high water level is selected by the placement of an enlarged pin or stop member 66 positioned through one of the plurality of upper apertures 64.

The float 46, which is substantially cylindrical in shape, includes a preferably integrally formed guide or boss member 70 which extends outwardly from the periphery thereof on the same side of float 46 as the position of linkage 44. Boss 70 comprises an enclosed vertical slot through which the linkage 44 freely extends.

Also positioned on the periphery of float 46, in juxtaposition to boss 70, is a catch member 72, which has an outer engageable surface similar to that presented by notch 62 formed in linkage 44. Catch member 72 preferably includes means for effectuating a fine adjust in the form of a vertical adjusting slot 74 and associated screw tightening means 76. The vertical position of catch 72 finely defines the first, lower water level 120.

Reference numeral 80 indicates generally a means for adjusting the lateral position of linkage 44. Adjusting means 80 includes a linkage support member 82 which is in the form of a rectangular hollowed member which receives the top portion of linkage 44 that passes freely therethrough.

Means are provided for actuating the linkage support member 82 which, in a preferred embodiment, comprises a cable indicated generally by reference numeral 84. Cable 84 is preferably of the bowden type and includes an outer sheath 86 and a moveable inner wire or cable element 88.

A cable support member 78 is connected to the top portion of vertical guide 50. One end of the outer sheath 86 of cable 84 is journaled to an upstanding flange of the support 78 as by a threaded nut 90. Inner wire or cable element 88 extends through the flange of support 78 to be fastened to the linkage support member 82 which is moveable laterally therewith. The distal end of cable elemet 88 is connected to a push-button actuator 92 positioned within the handle assembly 38.

The structure of actuator 92 is illustrated in more detail in FIG. 3 to which attention is now directed. The outer sheath 86 of cable element 88 includes a threaded portion 94 formed at one end thereof to secure sheath 86 to the shaft 96 of handle 38. A set screw 98 holds the end of lever 24 to enable it to turn with shaft 96.

A central aperture 101 is formed in handle 38 and shaft 96 which houses a light-weight compression spring 108 against the base 110 thereof. A collar 100 is threadingly secured within the aperture 101 and push-button actuator 92 extends therethrough. Connected to the distal end of push-button 92 is a flange 106 which is normally biased against collar 100 by virtue of spring 108. To the center of flange 106 is fastened one end of the moveable cable or wire 88, such that upon depression of push-button 92 against the force of spring 108, cable 88 will move to the left as indicated by the arrow in FIG. 3. A pair of washers 102 and 104 are also provided to ease the rotational movement of handle 38 and lever 24 against tank 10.

Referring now to FIGS. 2, 4 and 6, the mode of operation of the preferred embodiment of the present invention will now be described. FIG. 2 illustrates the low water level condition, which prevails within water tank 10 most of the time. The low water level indicated by reference numeral 120 is normally established by virtue of the biasing of support member 82 to the left as viewed in FIG. 2. This, in turn, insures that notch 62 of linkage 44 will be engaged by catch member 72 of float 46 during the upward travel fo float 46 as the tank 10 is filling with water after a flushing operation. When catch member 72 engages notch 62, the hinged connection provided by pivot 43 to the control arm 42 of inlet valve 40 will turn valve 40 off at the height of the float 46 defined by the illustrated low water level 120. This condition will remain static by virtue of the spring biasing arrangement (illustrated in detail in FIG. 3) which urges the top portion 60 of linkage 44 to the left (as viewed in FIG. 2) and therefore causes catch 72 to remain in engagement with notch 62.

If the user of the toilet should determine that the relatively low volume of water defined by level 120 will be sufficient for the disposal of, for example, only liquid wastes within the toilet bowl, he need do nothing further other than to flush the toilet in the usual fashion by tripping handle 38 in order to open valve 22 and thus empty the relatively small amount of water within tank 10 through pipe 32. When the tank 10 refills, it will again fill only to the low level indicated by numeral 120, as explained above.

If, on the other hand, the user of the toilet determines that a larger volume of water will be necessary to dispose of, for example, solid wastes within the toilet bowl, he need merely actuate push-button 92 which will, in turn, drive cable 88 and support 82 to the right, as indicated by the arrow in FIG. 4. The lateral movement of support 82 will carry with it the top portion 60 of linkage 44 until notch 62 becomes disengaged from catch member 72 of float 46. At this point, the weight 56 will cause the linkage 44 and connected control arm 42 to drop to the position illustrated in FIG. 4 to turn on inlet valve 40. The water level within tank 10 will then begin to rise to, for example, the intermediate level indicated in FIG. 4 by reference numeral 130, carrying with it the float 46. The linkage 44 will stay in its lowered position as dictated by the weight 56, all the while being constrained by the conduit defined by boss 70.

The user need only depress the push-button 92 momentarily, until notch 62 has had an opportunity to unseat from catch 72, and weight 56 has caused valve 40 to open. The user may release push-button 92 as soon as he hears valve 40 opening and/or wate being admitted to tank 10.

After push-button 92 has been released, the linkage 44 will be again biased in its leftward position such that the left edge of upper portion 60 as viewed in FIG. 4 will rest against the right edge of catch member 72 as float 46 travels up its guide 50 with the increasing water level. Judicious selection of low-friction materials for members 44 and 72, as well as provision of a lightweight spring 108, will minimize binding between linkage 44 and float 46 and assure a smooth upward travel of the latter.

Referring to FIG. 6, when the upper end 112 of boss 70 contacts stop pin 66 positioned in linkage 44, it will cause the latter to rise with float 46 until control arm 42 moves to the position illustrated in FIG. 6 to turn off valve 40 when the high water position, indicated generally by reference numeral 140, is attained. At this point, the water tank 10 may be emptied in the usual fashion by flushing, and the full volume thereof may be utilized to dispose of the solid wastes within the toilet bowl.

After flushing, the leftward biasing of linkage 44, as explained hereinabove, will cause the upward movement of catch member 72 to engage the shoulder 62 of linkage 44 to permit tank 10 to fill only to its first, normally low water level 120 (FIG. 2).

Thus, the system of the present invention requires positive, but only momentary, action to admit a large volume of water to the tank for the lower percentage of use, solid waste type of flushing. The present invention is particularly designed to be incorporated with the vertical float type of ball cock and valve mechanisms hereinabove described, and may be particularly attractive to previous customers of such mechanisms when packaged in a kit form. The provision of support member 78 is to insure that the proper lateral action may be imparted to linkage 44 by cable 88 regardless of the orientation of the vertical guide 50 within the tank 10 after installation. Also, the materials of guide 82, support 78, boss 70, catch member 72, and linkage 44, as well as the other components, may be suitably be made from, for example, plastic or the like.

Obviously, numerous modifications and variations of the present invention are possible in light of the above teachings. It is therefore to be understood that within the scope of the appended claims, the invention may be practiced otherwise than as specifically described herein.

I claim as my invention:

1. In a toilet having a water tank, a bowl, an outlet valve for releasing the water in said tank to flush wastes from said bowl, an inlet valve for supplying water to said tank, said inlet valve being controlled by a float mounted for vertical movement on a vertically oriented guide, the improvement which comprises adjustment means selectively coupling said float to said inlet valve for adjusting the water level within said tank at which said inlet valve is turned off, and means mounted externally of said tank for actuating said adjustment means, said adjustment means comprising catch means disposed on said float and lever means coupled to said inlet valve and having notch means selectively engageable by said catch means.

2. The improved toilet as set forth in claim 1, wherein said adjustment means comprises means for selecting one of two distinct water levels, relatively low and relatively high, at which said inlet valve is turned off.

3. The improved toilet as set forth in claim 2, wherein said lever means is connected to said inlet valve for turning same on and off and said notch means is selectively engageable by said catch means to turn off said inlet valve at said relatively low water level.

4. The improved toilet as set forth in claim 3, wherein said float means further comprises boss means positioned on the periphery thereof through which said lever means extends.

5. The improved toilet as set forth in claim 4, wherein said catch means selectively engages said lever means during upward movement of said float means.

6. The improved toilet as set forth in claim 5, wherein said catch means comprises a catch member protruding from the periphery of said float at a position adjacent said boss means.

7. The improved toilet as set forth in claim 6, wherein said notch means comprises a notch formed along an edge of said lever means for selective engagement by said catch member.

8. The improved toilet as set forth in claim 7, wherein said actuating means includes means for normally biasing said notch into the path of the upward movement of said catch member.

9. The improved toilet as set forth in claim 8, wherein said biasing means comprises means coupled to said lever means for permitting said notch to be positioned out of the path of said catch member.

10. The improved toilet as set forth in claim 9, wherein said biasing means further comprises spring-loaded push-button actuator means positioned externally of said tank and means connecting said push-button actuator means to said lever means for controlling the positioning thereof.

11. The improved toilet as set forth in claim 10, wherein said inlet valve includes a control arm and said lever means comprises a substantially rigid, vertically oriented link having one end pivotally connected to the control arm of said inlet valve and whose other end extends through a guide member which is laterally moveable in response to said spring-loaded push-button actuator means.

12. The improved toilet as set forth in claim 11, wherein said one end of said link has weighted means connected thereto for opening said inlet valve upon actuation of said actuator means.

13. The improved toilet as set forth in claim 11 wherein said link further includes means positioned above said notch for engagement by said boss means on said float means when the latter has risen to said relatively high water level.

14. The improved toilet as set forth in claim 11, wherein said means connecting said actuator means to said lever means comprises a cable connected between said guide member and an externally provided push-button.

15. The improved toilet as set forth in claim 14, further comprising a support member positioned on the top portion of said vertically oriented guide, said cable being fed through said support member.

16. In a toilet having a water tank, a bowl, an outlet valve for releasing the water in said tank to flush wastes from said bowl, an inlet valve for supplying water to said tank, said inlet valve being normally biased downwardly and controlled by float means mounted for vertical movement on a vertically oriented guide, the improvement which comprises lever means coupled to said inlet valve and having means normally engageable by said float means to turn off said inlet valve when the water level reaches a first position, means mounted externally of said tank for selectively disengaging said lever means from said float means to thereby turn on said inlet valve to allow the water level to rise above said first position, and means coupled to said lever means for reengagement by said float to turn off said inlet valve when the water level has reached a second position above said first position.

* * * * *